United States Patent [19]

Savill

[11] Patent Number: 4,930,729

[45] Date of Patent: Jun. 5, 1990

[54] CONTROL OF FLUID FLOW

[75] Inventor: Anthony M. Savill, Cambridge, England

[73] Assignee: Rolls-Royce plc, London, England

[21] Appl. No.: 372,153

[22] Filed: Jun. 27, 1989

[30] Foreign Application Priority Data

| May 22, 1986 | [GB] | United Kingdom | 8612485 |
| May 22, 1986 | [GB] | United Kingdom | 8612486 |
| May 22, 1986 | [GB] | United Kingdom | 8612487 |
| Mar. 19, 1987 | [GB] | United Kingdom | 8706554 |

[51] Int. Cl.$^5$ .............................................. B64C 21/10
[52] U.S. Cl. ...................................... 244/200; 244/130
[58] Field of Search ............... 244/198, 199, 200, 130, 244/204; 138/37, 38

[56] References Cited

U.S. PATENT DOCUMENTS

| 208,211 | 9/1878 | Swasey | 416/236 A |
| 4,650,138 | 3/1987 | Grose | 244/200 |
| 4,706,910 | 11/1987 | Walsh et al. | 244/199 |
| 4,786,016 | 11/1988 | Presz, Jr. et al. | |

FOREIGN PATENT DOCUMENTS

| 205289 | 12/1986 | European Pat. Off. | |
| 216384 | 4/1987 | European Pat. Off. | 244/200 |
| 718498 | 11/1954 | United Kingdom | |

OTHER PUBLICATIONS

AIAA'83—AIAA-83-0227, Turbulent Drag Reduction for External Flows, D. M. Bushnell, p. 6, lines 16-64.
Mechanical Engineering, vol. 103, No. 3, Mar. 1981, p. 71, Grooves Reduce Aircraft Drag.
AIAA-83-0230—An Experimental Study of Changes in the Structure of a Turbulent Boundary Layer Due to Surface Geometry Changes; Hooshmand et al., Jan. 1983.
AIAA 12th Aerospace Sciences Meeting—Turbulent Boundary Layer Drag Reduction Using Riblets; Walsh, Jan. 1982.
AIAA 22nd Aerospace Sciences Meeting—Optimization and Application of Riblets for Turbulent Drag Reduction; Walsh et al., Jan. 1984.
ICAS '86—Paper No. 86-1.8.3—Drag Reduction Mechanisms Derived from Shark Skin; Bechert et al.; Sep. 1986.

Primary Examiner—Galen Barefoot
Attorney, Agent, or Firm—Cushman, Darby & Cushman

[57] ABSTRACT

To modify a turbulent boundary layer flow over a surface to reduce its drag, a series of streamwise riblet projections is provided on the surface arranged in a pattern consisting of spaced large height projections between which are a plurality of smaller height projections. The latter inhibit turbulent eddy motions from penetrating deep into the grooves between them and so displace the turbulent motion away from the wall. The larger projections control the longitudinal vortices or streaks that are characteristic of turbulent boundary layer flow and promote energy transfer to the smaller scale secondary vortices associated with the smaller projections. In another configuration the projections are arranged in a repeated spanwise pattern in which the adjacent projections in each pattern repeat project to different heights, the different heights being so scaled in relation to each other and to the boundary layer thickness that the displacement of the turbulent motion away from the surface by the smaller height projections is extended further by the larger height projections. A further possibility lies in increasing the heights, and possibly also the pitches, of the projections progressively in the downstream direction to mitigate the self-limiting effect of the projections as they establish a raised virtual wall surface for the turbulent boundary layer, the increase being made, continuously or in one or more steps.

50 Claims, 5 Drawing Sheets

CONTROL OF FLUID FLOW

This is a continuation of application Ser. No. 07/52,867, filed May 22, 1987 now abandoned, which was abandoned upon the filing hereof.

FIELD OF THE INVENTION

This invention is concerned with the modification of turbulent boundary layer flows over aerodynamic and hydrodynamic surfaces.

BACKGROUND OF THE INVENTION

There have been many investigations in recent years of the effects that small-geometry surface configurations can have on turbulent boundary layers. Particular attention has been paid to the provision of so-called riblet surfaces in which an array of small longitudinal ribs extend over the turbulent boundary layer region of a surface in the direction of fluid flow over the surface, and experimental results indicate that net or surface drag reductions of up to about 7% can be achieved.

In a paper "Drag Characteristics of V-Groove and Transverse Curvature Riblets" (presented by M. J. Walsh at the Symposium on Viscous Drag Reduction, Dallas, Tex., Nov. 7-8, 1979) reference is made to an early investigation (1966) by Liu, Kline, and Johnston in which drag reductions of 3-4% were obtained by reducing the turbulent bursting rate (i.e. the rate of break-up of the low speed longitudinal vortices or "streaks" that are characteristically formed in a turbulent boundary layer flow close to a wall) by employing rectangular fins. Walsh's paper reports the investigation of a number of alternative rib profiles and states that he was able to obtain a maximum drag reduction of 7% using V-groove riblets, this representing substantially the greatest reduction of skin friction drag that experimenters have been able to obtain up to the present.

The drag reduction may be associated with the ability of the riblets to limit random spanwise movements of the streaks, as has been suggested by a number of sources, e.g. R. E. Falco (AIAA-83-0377, AIAA 21st Aerospace Sciences Meeting, Jan. 10-13 1983, Reno, Nev. Johansen and Smith (AIAA-85-0547, AIAA-Shear Flow Control Conference, Mar. 12-14, 1985, Boulder, Colo.) have shown that cylindrical riblets of a smaller height than the V-groove riblets with which Walsh obtained has optimum results, have the effect of anchoring and/or creating sites of low-speed streaks in a limited region above the wall surface, but their experiments also showed drag increases of 3% to 8%. More recently, S. P. Wilkinson has attempted to follow Johansen and Smith by using blade riblets to anchor or create low-speed streaks by the use of riblets and then use V-groove riblets between the streak anchors to control bursting, but it is not yet reported whether a net drag reduction has been achieved thereby.

The results reported from these and other previous investigations all show the effect of riblets is rather limited, and that has led to the search for alternative solutions.

It has been proposed (U.S. patent application No. 686959 of M. J. Walsh et al - NASA Case LAR-13286-1) to reduce skin friction more effectively by providing a riblet surface with superimposed large-eddy break-up devices (LEBU's) as manipulators for the outer region of the boundary layer but such an arrangement adds considerable complexity and is susceptible to wear and especially accidental damage. In another proposal ("On the Drag Reduction of the Shark Skin", Bechert, Hoppe and Reif, AIAA-85-0546) it has been suggested that it may be appropriate to use so-called vortex generator surfaces which are configured so as to produce tangential mixing using local flow conditions over a ridge-pattern structure analogous to the configuration of scales on a shark's skin. It is claimed that this could lead to greater drag reduction, but it would also be inherently complicated and difficult to build up a simulation of the scaly surface that the investigators have concluded is responsible for the low drag characteristic.

In contrast to these attempts to reduce skin friction by rather complex means, riblet surfaces are less susceptible to damage and they can be formed relatively straightforwardly, e.g. by machining or pressing or by the application of a preformed, e.g. extruded, layer. It would clearly be preferable to employ such surfaces if they were able to give greater reductions of skin friction drag.

The mechanisms by which riblets influence the turbulent boundary layer over a wall is not yet fully understood and it is perhaps significant that different researchers have published conflicting data about the variation of net reduction of skin friction with rib length. If it can be postulated that they bring a turbulent flow closer to laminar flow conditions their efficiency is low, bearing in mind that in equivalent turbulent and laminar flow regions the skin friction drag with laminar flow would be 80% less than that with turbulent flow. If a more significant proportion of this potential improvement could be achieved, the use of riblet surfaces could offer marked advantages over the complex drag reduction systems described above.

SUMMARY OF THE INVENTION

According to one aspect of the present invention, there is provided an aerodynamic or hydrodynamic wall surface which is provided with a series of elongate projections extending in the direction of fluid flow relative to the surface for modification of a turbulent boundary layer on said surface, said projections comprising spaced larger height projection between each successive pair of which are a plurality of smaller height projections.

The projections preferably form a substantially continuous spanwise array. It is also preferred to form both the larger and smaller projections with sharp-peaked profiles.

The smaller height projections of this novel configuration correspond to the riblets of recent researchers. They function to inhibit turbulent eddy motions in the boundary layer from penetrating to all parts of the surface, in particular deep into the grooves defined by adjacent riblets, resulting in a displacement of the turbulent motion away from the wall. Depending upon their profile, they may also have some effect in inhibiting the spanwise gradients associated with the formation of the longitudinal vortices or "streaks" in the boundary layer and initiating secondary, smaller-scale longitudinal eddies which take energy from the larger scale streaks. Such riblets however, have hitherto only shown limited results, and it seems that this is because they have functioned wholly or primarily in a passive manner with little influence on the evolution of the eddies themselves. In that case they are largely unable to moderate the mixing and momentum transfer that the eddies encourage and that is the major factor in the increase of boundary layer drag of turbulent flow in comparison with laminar flow.

If, however, the larger height projections are provided as, preferably individual, riblets set at appropriate intervals between series of smaller height riblets, the longitudinal vortices or streaks, which otherwise shift in a random manner transversely across the surface, can not only be constrained laterally but can be moved further apart than their natural spacing. By increasing the disparity between the spanwise scale of the streaks and that of the smaller riblets, the larger riblets can promote a more rapid energy transfer from the streaks to the smaller-scale secondary vortices that these smaller riblets induce, and they can produce effects that permeate to the region above the smaller riblets and so improve the effectiveness of these riblets in that these reduce eddy activity there. In this sense both the larger and smaller riblets are able to function in an active manner.

According to another aspect of the present invention, there is provided an aerodynamic or hydrodynamic wall surface which is provided with a series of elongate projections extending in the direction of fluid flow relative to the surface for modification of a turbulent boundary layer on said surface, said projections being disposed in a repeated spanwise pattern in which the adjacent projections in each pattern repeat project to different heights.

In this aspect of the invention also, the projections preferably form a substantially continuous spanwise array of riblets. It is also preferred to form the projections with sharp-peaked profiles.

In the simplest example, the repeated pattern consists of alternating higher and lower riblets. It is possible, however, to form a pattern of riblets of three, or even more than three, heights that will provide advantages over the known uniform height riblet surfaces. Such patterns are preferably symmetrical.

Considering the example of alternating higher and lower riblets, the lower riblets function to inhibit turbulent eddy motions in the boundary layer from penetrating to all parts of the wall surface, in particular deep into their grooves, resulting in a displacement of the turbulent motion away from the wall with the establishment of a virtual surface some ¾ of their height above the wall. The alternating higher riblets are so scaled in relation to the lower riblets and the boundary layer thickness that they have the function of extending this effect because of their greater scale their action is complementary to that of the lower riblets and the turbulent eddy motions are kept further from the wall surface.

If the pattern consisted of riblets of three different heights, this effect is taken a stage further, but the additional improvement would now be less than the improvement already given by a pattern of ribs of two different heights. The use of a pattern with ribs of substantially more than three different heights will not generally give sufficient further improvement to justify its complexity.

It appears to be the case that riblets of the kind already known function wholly or primarily in a passive manner and do not have any significant influence on the evolution of the eddies themselves. This may also be true of the wall surface configurations of the present invention, but a greater reduction of skin friction can be obtained because, in addition to providing their own contribution the lower riblets modify the deep boundary layer region so that the higher riblets can be similarly operative at a greater distance from the wall surface.

Depending upon their profile, the riblets may also have some effect in inhibiting the spanwise gradients associated with the formation of longitudinal vortices or "streaks" in the boundary layer and initiating secondary, smaller-scale longitudinal eddies. However, in view of the relatively small drag reductions obtained in the published investigations of riblet surfaces, this would seem not to be a major effect, and the improvement offered by the differing heights of the adjacent projections of the pattern does not rely on the riblets having such an influence.

The relatively low efficiency of the earlier known riblet surfaces may also be because their performance tends to be self-limiting. The displacement of turbulent eddy motions away from the wall surface by the riblets tends to reduce the wall shear stress, which has a scaling influence reducing the effective height of the riblets, and therefore curbing their efficiency. The presence of the higher riblets reinforces the action of the lower riblets and so forces the turbulent eddy motions further from the wall surface. At the same time this automatically compensates for any loss of efficiency of the smaller riblets. Another secondary benefit is also obtainable because there is some degree of progressive reduction of wall shear stress with the stream development length (i.e. the streamwise distance along the wall surface) that may be significant in the transition region and the early part of the turbulent boundary layer. The smaller riblets of a suitable height for an early region of the turbulent boundary layer will therefore progressively show less effect along their length, but the higher riblets now present extend the effective area of the ribbing to a greater stream development length.

According to a further aspect of the present invention, there is provided an aerodynamic or hydrodynamic wall surface which is provided with a series of elongate projections extending in the direction of fluid flow relative to the surface for modification of a turbulent boundary layer on said surface, said projections having progressively increasing heights with distance along the wall surface in the direction of fluid flow.

The projections preferably form a substantially continuous spanwise array, with an increase in the aspect ratio of the projections transverse cross-section to give the increased height. It is preferred in this aspect of the invention also to form the projections with sharppeaked profiles.

Based upon the concept stated above, that the projections or riblets function to inhibit turbulent motions in the boundary layer from penetrating to all parts of the wall surface, in particular deep into the grooves, resulting in a displacement of the turbulent motion away from the wall, the progressive increase of the height of the riblets can extend those effects without disrupting the flow pattern. A secondary benefit arises because the self-limiting tendency of the flow, due to the fact that a virtual wall position is created at a substantial part of the initial height of the riblets, is opposed by the increase of the riblet height. The increase of riblet height can therefore counter the degradation of their performane that would otherwise result from that tendency.

A further benefit is obtainable because the progressive reduction of wall shear stress with streamwise development length already referred to can be countered by enhancing the increase of height of the projections, with the result that the height increase more than compensates for the degradation of performance that the change of virtual wall position produced on fixed height projections.

It is preferable to have a continuous increase of height, the projections then appearing as "ramplets". A simpler arrangement, although possibly less efficient, would be to provide succeeding bands of progressively higher projections so that the projections of each band have a uniform height. The bands are assembled together to present to the stream a series of projections with progressively stepped increasing heights. The projections may also be given increases of pitch along their length.

In a preferred configuration according to the present invention, the projections, or at least the larger height projections where there are projections of different heights, have side faces that are inclined at an angle that varies over the height of the projections, each said side face having an intermediate region at a lesser steepness than the adjacent regions above and below said region and forming the lower part of a concave profile peak of the associated projection.

For best effect the transition to the concave-sided peaks should be positioned at or close to the virtual wall height established by the projections. The region below the transition preferably has substantially planar faces so as to form a series of steep-sided V-grooves between the projections in their lowest reaches. These can act in the manner already described to displace the turbulent motion away from the wall surface. The longitudinal vortices displaced above the virtual wall surface are then controlled by the concave peaks projecting into this region which, by virtue of their different profile, can act more strongly on the vortices.

When a pattern of different height projections is employed, if the enhanced displacement of the virtual wall surface resulting from the combination of projection heights puts that virtual surface above the height of the smallest projections, no benefit is achieved by modifying their side faces. To the extent that any of the smaller projections extends above the virtual wall position, it is an advantage that their side faces be given a varied inclination similarly, with the transition substantially at the height of the virtual wall position. This may result in a change of inclination occurring at a particular height above the actual wall surface that is the origin of the projections, but in particular cases the pattern of projections may produce a virtual wall surface height that varies spanwise with the projection pattern, and the positions of the changes of inclination on the individual projections can then follow those changes of height.

The transition to the concave profile may be substantially sharp-edged, but it is also possible to have a radiussed or chamfered transition. The concave faces are preferably continuously curved to a relatively sharp-edged tip but it is also possible to build them up from a group of straight and/or curved sections and for convenience the tip itself may be flattened or radiussed.

By way of example, reference will now be made to the accompanying schematic drawings.

DESCRIPTION OF THE PREFERRED EMBODIMENTS

Figure 1:
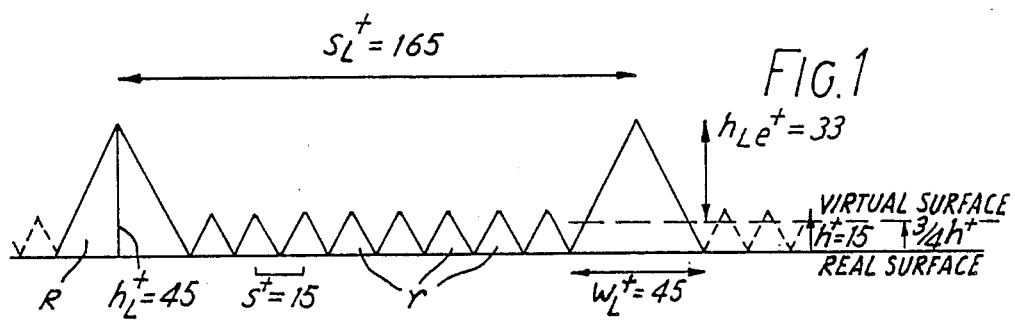
FIG. 1 illustrates a transverse cross-section through a form of wall surface in accordance with the invention, perpendicular to the flow direction over the surface.

In FIG. 1, the wall surface is continuously ribbed in a regular pattern spanwise which consists of parallel groups of 8 uniform, smaller riblets r between individual larger riblets R, the riblets running in the stream direction over the surface in the turbulent boundary layer region, and preferably starting from the transition region of the flow over the surface. The pattern extending streamwise preferably continues over all the turbulent boundary layer area of the surface. The riblets are all shown with triangular profiles, but other profiles can be used, another preferred profile having a sharp-peaked form (apex included angle preferably not greater than about 20°) with concave valleys between successive peaks, as is illustrated with the riblets R', r' in FIG. 2. Furthermore, while FIG. 1 shows the riblets with base widths equal to their heights it may be preferred to increase the base widths to about twice the heights of the respective riblets; this is particularly relevant to cusp-shaped profiles shown in FIG. 2.

The preferred sizes and dimensional relationships of the riblets may be expressed in the non-dimensional form of so-called "law of the wall" variables, in which actual distance values are multiplied by a "wall unit" scalar quantity defined as:

$$\frac{\sqrt{\tau/\rho}}{\nu}$$

where $\tau$ is the wall shear stress, $\rho$ is the fluid density, and $\nu$ is the fluid kinematic viscosity.

In the example, the smaller riblets r have a non-dimensionalised height $h^+$ of 15 units and are set at a pitch $s^+$ also of 15 units. The larger riblets R are three times this size, with height $h_L^+$ and width $w_L^+$ at 45 units, giving a pitch $s_L^+$ of 165 units.

Because of the presence of the smaller riblets r, a virtual surface is established for the turbulent boundary layer flow some threequarters of their height above the wall surface itself. The effective height ($h_{Le}^+$) of the larger riblets R, i.e. their height above the virtual surface, is therefore approximately 33 units. The larger riblets act in the region above the virtual surface to control the long regions of streamwise vorticity or streaks that form in the boundary layer by inhibiting their random spanwise movements, increasing their natural spanwise spacing, and encouraging the transfer of energy from the streaks to the smaller scale secondary vortices induced by the smaller riblets. In this flow mechanism, the actions of two forms of riblet reinforce each other in that the larger riblets influence the boundary layer to produce flow patterns which are associated with inherent reductions in drag and at the same time are more suited to manipulation by the smaller riblets, while the latter make their own contribution to the reduction of skin friction by moving the turbulent boundary layer flow some way up their height. It is also possible that the presence of the smaller riblets, by changing the virtual wall position, so reduces the wall shear stress that the streaks are weakened and are therefore more amenable to control.

Figure 3:
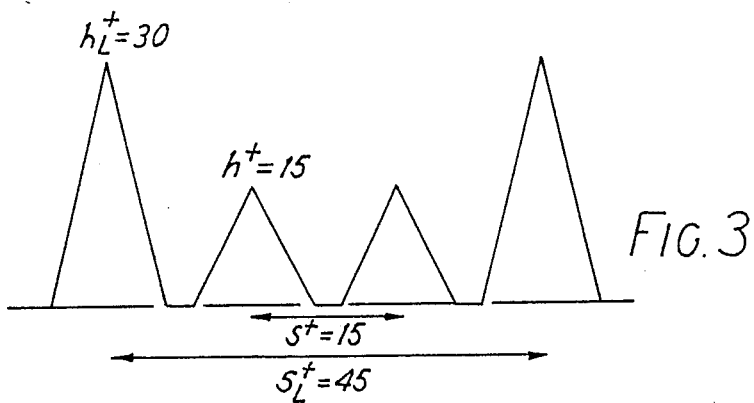

FIG. 3 illustrates another riblet pattern which has only a pair of smaller riblets r between successive larger riblets R, and in which successive riblets are separated by flat valleys. In the particular example of FIG. 3, the smaller riblets have $h^+$ and $s^+$ each of 15 wall units. The larger riblets have a height $h_L^+$ of 30 units and their pitch $s_L^+$, which is of course the pattern repeat, is 45 units.

Figure 2:
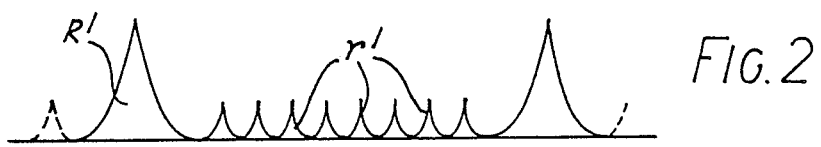
FIGS. 2 to 5 illustrate a number of modifications that can be applied individually or in any combination to the configuration of FIG. 1.
Figure 4:
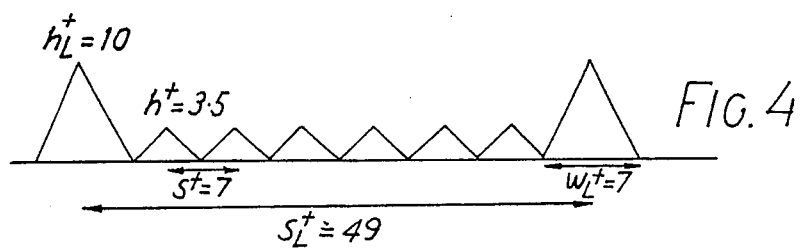

It may be preferred, especially when using rounded or flatbottomed valley configurations as in FIG. 2 and 3, to reduce the heights of the smaller riblets in relation to their pitch. FIG. 4 illustrates an example with six smaller riblets r between successive layer riblets R, with $h^+ = \frac{1}{2}s^+ = 3.5$ wall units, $h_L^+ = 10$ units and $s_L^+ = 49$ units.

Many other variations of the sizes and profiles of the riblets are possible within the scope of the invention. The ratio h:s is preferably not substantially less than 1:2 nor substantially greater than 2:1 as regards the smaller riblets, although higher aspect ratios h:w can be more easily tolerated for the large riblets to the extent of giving them a blade-like profile. As far as concerns sizes, the following are the preferred size ranges in non-dimensional wall units for low speed flow:

for the smaller riblets r, $2 \leq h^+ \leq 20$, and preferably $5 \leq h^+ 15$ $6 \leq s^+ \leq 40$, and preferably $10 \leq s^+ 20$ for the larger riblets R, $8 \leq h_{Le}^+ \leq 45$, and preferably $15 \leq h_{Le}^+ \leq 35$ $40 \leq s_L^+ \leq 240$, and preferably $80 \leq s_L^+ \leq 160$ In general, the base width $w_L^+$ of the larger riblets will be kept to less than 60 wall units. Variations within the ranges specified may be made independently for each parameter but the larger riblets must of course project above the smaller riblets and a minimum projection of eight wall units is desirable. Furthermore, the relationship of $s^+$ to $s_L^+$ must always allow at least two smaller riblets to be interposed between successive larger riblets.

Figure 5:
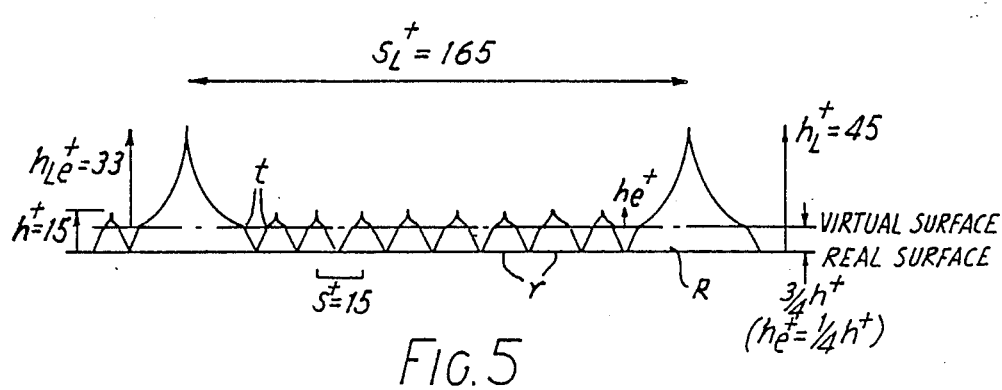

FIG. 5 illustrates another wall surface riblet pattern within the scope of the invention with modified riblet profiles. Like the example in FIG. 1, the smaller riblets r of this illustrative example have a non-dimensionalised height $h^+$ of 15 units above the wall surface and are set at a pitch $s^+$ also of 15 units. The larger riblets R have a height $h_L^+$ and width $w_L^+$ of 45 units, so that their pitch $s_L^+$ is 165 units.

The smaller riblets r establish a virtual surface for the turbulent boundary layer flow some $\frac{3}{4}h^+$ above the wall surface itself and below that level all the riblets have planar inclined side faces. At the level of the virtual surface there is a transition t to a smaller inclination and the riblets continue upwards from that point of inflection with concave side faces to a sharp-peaked tip, in analogy to the concave form of riblet illustrated in FIG. 2. Above the virtual wall surface, the larger riblets R have a height ($h_{Le}^+$) of 33 wall units, while the corresponding height ($h_e^+$) of the smaller riblets is 3 units.

The differently profiled regions are adapted to different functions. The regions below the virtual wall surface form the relatively deep V-grooves that are better able to inhibit penetration of turbulent eddy motions, while the concave faces above the virtual wall surface can more effectively promote very small scale longitudinal vortices which drain energy from the larger streaks in the turbulent boundary layer flow. To perform their functions effectively the concave faces should form relatively sharp-edged peaks.

It will be appreciated that the effects described can be achieved, at least in substance, with modified forms of the inclined side faces shown. In particular, it may be desirable for practical reasons to blunt the points of inflection or the peaks of the riblet faces; also, these faces may comprise straight and/or curved portions both below and above the virtual wall surface without unduly changing the general character of the profiles required for the functions described.

The number of smaller riblets between successive larger riblets can be greater or smaller than the group of 8 shown and the profiles of both series of riblets may be varied. If the larger riblets serve only to locate the streaks in position, their peaks may be flattened or rounded to reduce their inherent drag without affecting their function. If, however, they are employed to reduce the strength of the streaks, the top peaks will be retained and may be further emphasised by other changes of form. Similarly, the profile of the smaller riblets can be varied in accordance with their function.

Figure 6:
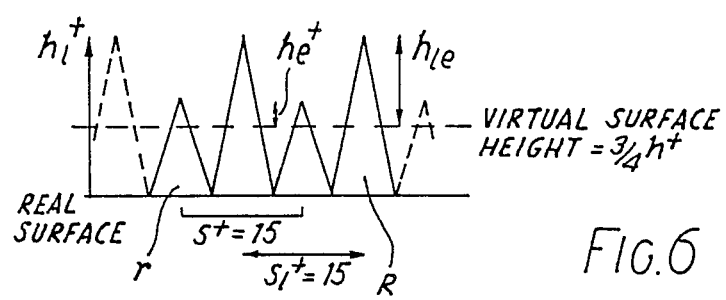
FIG. 6 illustrates in schematic form a transverse cross-section through another wall surface formed in accordance with the invention, perpendicular to the flow direction over the surface.

Referring now to FIG. 6, the wall surface is shown with alternating higher riblets R and lower riblets r, this pattern being repeated spanwise and the riblets running in the stream direction over the surface in the turbulent boundary layer region, and preferably starting from the transition region of the flow over the surface. The pattern extending streamwise preferably continues over all the turbulent boundary layer area of the surface. It is not essential that the riblets be aligned precisely wth the fluid stream and deviations of up to 10°-15° can be tolerated. The riblets are all shown with triangular profiles, but other profiles can be used, another preferred profile having a sharp-peaked from (apex included angle preferably not greater than about 20°) with concave valleys between successive peaks, as is illustrated with the riblets R', r' in FIG. 7. Triangular riblets separated by narrow flat valleys can also be used. Furthermore, while FIG. 6 shows both the large and small riblets with the same base widths to give relatively sharp isosceles triangular profiles, it may be preferred to increase the base widths to about twice the heights of the respective riblets; this is particularly relevant to cusp-shaped profiles shown in FIG. 7.

Figure 7:
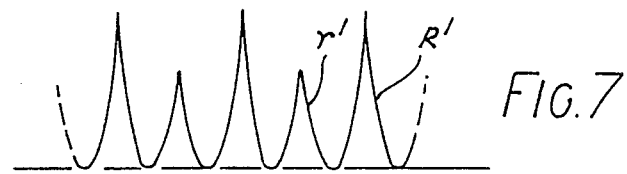
FIGS. 7 to 12 illustrate a number of modifications that can be applied individually or in combination to the configuration in FIG. 6.

In the example of FIGS. 6 and 7, the smaller riblets r have a non-dimensionalised height $h^+$ of 15 wall units and larger riblets R have a height $h_1^+$ of 25 wall units. The width $w^+$ of each of the riblets is 7.5 wall units giving a pitch $s_1^+$ of 15 wall units for the pattern repeat.

Because of the presence of the smaller riblets r, a virtual surface is established for the turbulent boundary layer flow above the wall surface itself. The influence of the riblets r may be sufficient to set this virtual surface some three-quarters of their height above the wall surface, so that the effective height ($h_{1e}+$) of the larger riblets R, i.e. their height above the virtual surface, is therefore approximately 13 units, but the larger riblets add their own influence in the region above this so that the virtual surface is displaced further out.

Many variations of the sizes and profiles of the riblets are possible within the scope of the invention. The ratio h:s is preferably not substantially less than 1:2 nor substantially greater than 2:1. Within this range the aspect ratio (height:base width) can be higher especially for the large riblets. As far as concerns sizes, the following are the preferred size ranges in non-dimensional wall units for low speed flow: for the smaller riblets r, $$2 \leq h^+ \leq 20; \text{ preferably } 5 \leq h^+ \leq 15$$

for the larger riblets R, $$8 \leq h_{le}^+ \leq 45; \text{ preferably } 15 \leq h_{le}^+ \leq 35$$

for the pattern repeat pitch, $$6 \leq s_1^+ \leq 50; \text{ preferably } 20 \leq s_1^+ \leq 40.$$

Variations within the ranges specified may be made independently for each parameter but of course the larger riblets must project above the smaller riblets and a minimum projection of 3 wall units is required for their effects to be noticeable.

Figure 8:
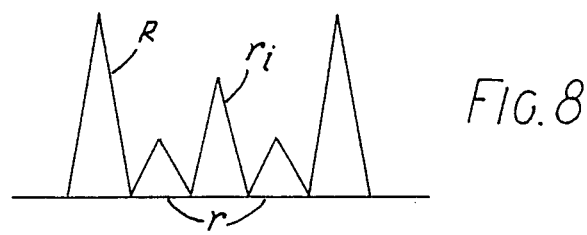
Figure 9:
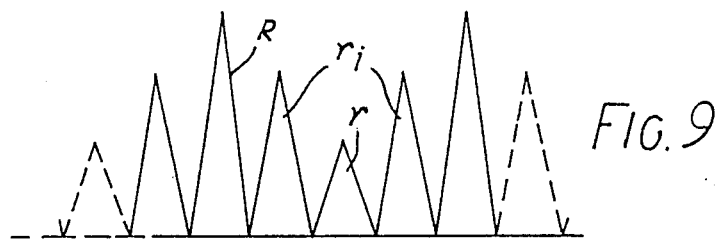

If a more extended pattern of riblets is used, the pattern repeat pitch will be increased while maintaining substantially the same base widths for the individual riblets. With riblets of three different heights, i.e. riblets $r_i$ of an intermediate height being interposed between higher and lower riblets in the manner illustrated in FIG. 8, the pattern repeat pitch is doubled. This is also the case for the example shown in FIG. 9 where the heights of the riblets decrease to a minimum in a region centrally positioned between the higher riblets. The profiles of the different height riblets may be different.

Figure 10:
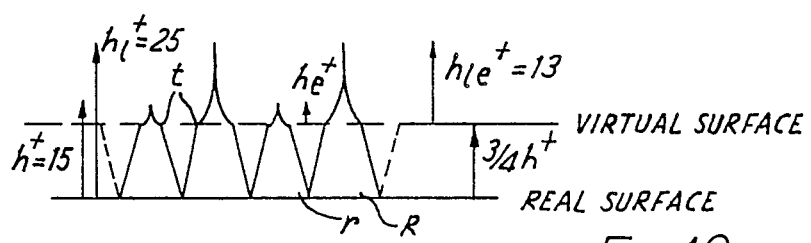
Figure 11:
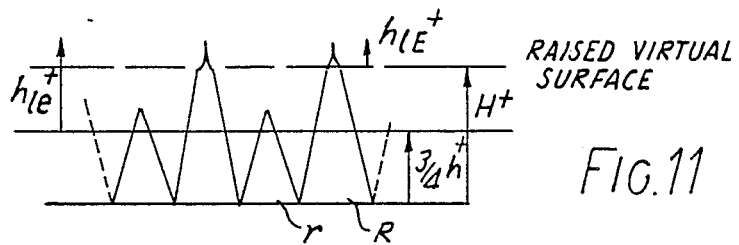
Figure 12:
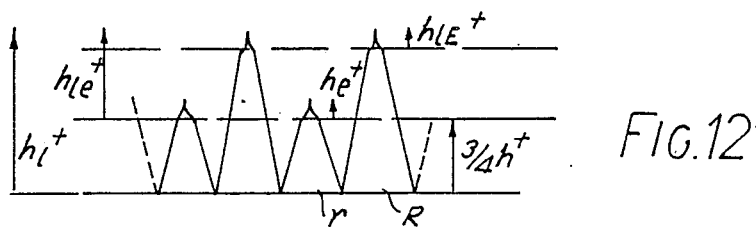

FIGS. 10 to 12 illustrate further wall surface riblet patterns having modified riblet profiles. In FIG. 10, a virtual wall surface is established at $\mu$ the height of the smaller riblets r in a pattern of alternating riblets of two different heights. The pattern pitch is 15 wall units, which is therefore the pitch ($s+$, $Si+$) of both the smaller and larger riblets. The height of the smaller riblets is 15 wall units and that of the higher riblets R is 25 wall units; above the virtual wall surface they have a height ($h_{le}+$) 13 units for the larger riblets and ($h_e+$) 3 units for the smaller riblets. From the point of transition t the side faces of the riblets extend upwards with the sharp-peaked concave profiles already described while below the virtual wall surface they form deep-sided V-grooves.

Whereas the smaller projections by themselves would not be able to establish a virtual surface above the wall surface by more than about three-quarters of their height, the higher projections can be so scaled in relation to the smaller projections that they have the funtion of extending this effect to its limit. If the presence of the larger riblets has the effect of taking the virtual wall surface higher the smaller riblets may lie entirely below the virtual surface. FIG. 11 illustrates a modification of the example in FIG. 10 in which this occurs and it shows that in addition to the $\frac{3}{4}h+$ displacement of the wall surface produced by the smaller riblets, the larger riblets may induce a further displacement in the region of $\frac{3}{4}h_{le}+$ so that the virtual wall surface is at a height of approximately ($\frac{3}{4}h+ + \frac{3}{4}h_{le}+$). The height of the smaller riblets being less than this they therefore have a completely planar profile, while side faces of the larger riblets are given their concave form over their effective height ($h_{1E}+$) from the raised virtual wall surface.

It may be found, however, that a riblet pattern in which the height changes between successive riblets produces a similarly undulating virtual wall surface, especially if the pattern consists of more than two riblets. This can be accommodated by a configuration such as is shown in FIG. 12. Here it is assumed that the virtual wall surface height for the smaller riblets r corresponds to that in the example of FIG. 10, whereas for the larger riblets R is corresponds to that in FIG. 11. The point of inflection of the smaller riblets, i.e. their intersection with the virtual surface, is at $\frac{3}{4}h+$ above the real surface, i.e. the base line of the pattern of riblets, and for the larger riblets the point of inflection is at approximately ($\frac{3}{4}h+ + \frac{3}{4}h_{le}+$) above the real surface. The portion of the smaller riblets having a concave profile thus extends over a height $\frac{1}{4}h+$ while the concave profile of the larger riblets extends over a height approximately $\frac{1}{4}(h_1+ - \frac{3}{4}h+)$.

In the riblet patterns of FIGS. 10 to 12, to perform their functions effectively the concave faces should form relatively sharp-edged peaks.

It will be appreciated that the effects described can be achieved, at least in substance, with modified forms of the inclined side faces shown. In particular, it may be desirable for practical reasons to blunt the points of inflection or the peaks of the riblet faces; also, these faces may comprise straight and/or curved portions both below and above the virtual wall surface without unduly changing the general character of the profiles required for the functions described. Furthermore, the peaks of the larger riblets may be flattened or rounded to reduce their inherent drag without affecting their displacement function.

Figure 13:
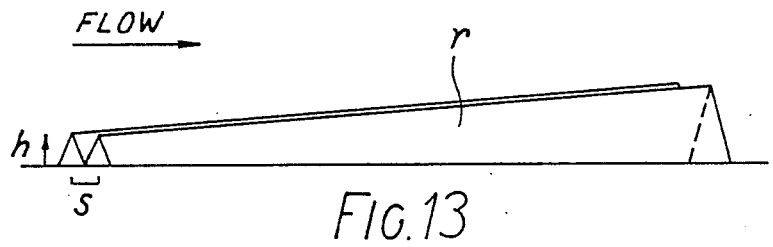
FIG. 13 illustrates a further form of the invention in a pair of triangular cross-section projections or riblets of an array of such riblets on a wall surface.

In FIG. 13, the wall surface has a continuous series of riblets r running in the stream direction over the surface, starting in the transition region, or at least from the onset of the turbulent boundary layer region, and preferably over the entire turbulent boundary layer area of the wall. The riblets have a constant base width in this example but their height increases continuously along their length to give them an increasingly sharper triangular profile. They can have other profiles, such as the sharp peaks (apex included angle preferably not greater than 20%) with rounded valleys shown in FIG. 14. Furthermore, while FIG. 13 shows the riblets with base widths equal to their heights at their upstream end it may be preferred to increase the base widths to about twice the upstream end heights of the respective riblets; this is particularly relevant to cusp-shaped profiles shown in FIG. 14.

Figure 15:
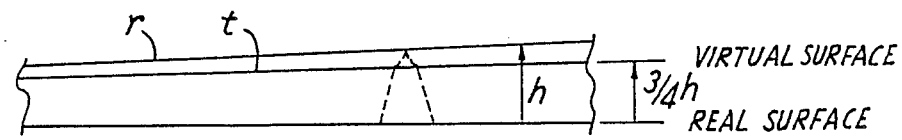

FIG. 15 illustrates another form of profile that can be employed for the riblets of the present invention. It is assumed that the riblets establish a virtual wall surface at some $\frac{3}{4}h$. Below that level there is a V-groove profile, whereas there is a change of slope at that level, from which the riblets extend with sharp-peaked concave profiles. As in preceding examples, differently profiled regions are adapted to different functions. The regions below the virtual wall surface form the relatively deep V-grooves that are better able to inhibit penetration of turbulent eddy motions, while the concave faces above the virtual wall surface can more effectively promote very small scale longitudinal vortices which drain energy from the larger streaks in the turbulent boundary layer flow. To perform their functions effectively the concave faces should form relatively sharp-edged peaks. Since h is itself increased with distance along the direction of fluid flow, the point of transition of the profile also rises along the length of the riblet.

It will be appreciated that the effects described can be achieved, at least in substance, with modified forms of the inclined side faces shown. In particular, it may be desirable for practical reasons to blunt the points of inflection or the peaks of the riblet faces, while these faces may comprise straight and/or curved portions both below and above the virtual wall surface without unduly changing the general character of the profile required for the functions described.

Figure 16:

For ease of manufacture it may be preferred to achieve the increase of riblet height in a series of steps, as shown by the riblets $r_1$ succeeding the riblets r in FIG. 16, since uniform height riblets can be produced relatively easily by machining or extrusion, and if required at each step the leading edges of the riblets can be faired. The pitch of th riblets can similarly be progressively increased at each stage, as has already been mentioned above, not necessarily simultaneously with an increase of height.

Figure 14:
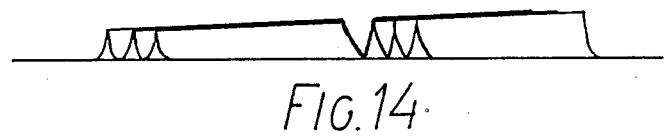
FIGS. 14 to 16 illustrate a number of modifications that can be applied individually or in combination to the configuration in FIG. 13, and FIGS. 17 to 21 illustrate some combined versions of the wall surfaces described with reference to the preceding figures.

In the examples of FIGS. 13 to 15, the riblets r have at their leading ends a non-dimensionalised height $h^+$ in the range: $2 \leq h^+ \leq 20$, preferably between 5 and 15 wall units. Their spanwise pitch or distance $s^+$ between adjacent apices is in the range: $6 \leq s^+ \leq 40$, preferably between 10 and 20 wall units. Variations within the ranges specified may be made independently for either parameter.

In all cases, it may improve performance, if, at their leading edges, the riblets are faired into the wall surface to avoid drag increments associated with the flow meeting a bluff leading face. For reducing wetted area it may also be possible to have short spanwiseextending gaps as seen in FIG. 14 (less than the boundary layer thickness $\delta$ in the streamwise direction) between riblet areas (themselves greater than $2\delta$ in streamwise length) without sacrificing the advantages offered by the riblets. Furthermore, it is not essential that the riblets be aligned precisely with the fluid stream and directions of up to 10°-15° can be tolerated.

Figure 17:
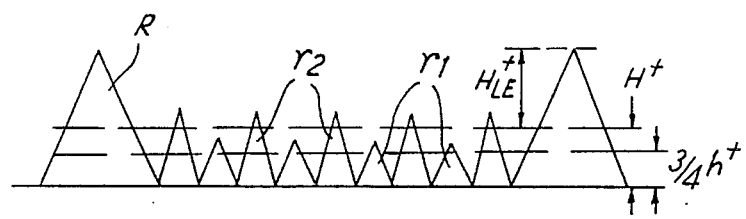

Further examples will now be described illustrating some of the possible combinations of the configurations already described. In the examples of FIG. 6, a reduction of the skin friction of a turbulent boundary layer is obtained by the use of a series of elongate projections disposed to a repeated spanwise pattern in which the adjacent projections in each pattern project to a different height. Such a configuration can be used in conjunction with the example presented in FIG. 1. In FIG. 17, groups of the smaller height projections $r_1$, $r_2$ between successive larger projections R are given different heights so as to operate more effectively on the inner boundary layer region between larger projections and so gain a reduction in skin friction that is additional to that resulting from the presence of said larger projections. This concept may also be realised in a riblet pattern in which there are groups of adjacent uniform height projections between projections of two different heights, e.g. in the example of FIG. 17, all the projections $r_2$ save the central one in the pattern being replaced by smaller projections $r_1$, this last arrangement having the advantage that wetted area is reduced. To retain their functional effect, the exclusion of any of the intermediate height riblets should be limited to the extent that it does not leave any group of the smallest ribs with a span of more than 50 wall units.

The function of the groups of smaller projections of different heights, as is described in relation to FIG. 11, is to displace the virtual wall surface further than is possible with uniform height smaller projections. The larger projections alternating with the groups of varying height smaller projections are intended to exercise the streak control functions described above, e.g. in relation to FIG. 1. For that purpose they must extend significantly higher above the virtual wall surface than any of the smaller height projections. In the example of FIG. 17 showing two heights of smaller V-groove riblets in alternation, the smaller riblets $r_1$ of height $h^+$ establish a virtual wall position which is the datum for effective height of the larger riblets $r_2$. If the effective height of the riblets $r_2$ is here termed $h_{1e}^+$ in distinction from the effective height $h_{LE}^+$ of the larger height riblets R, the new virtual wall position $H^+$ is at a height in the region of $0.75 h_1^+$, that is to say, $$0.75(h_{1e}^+ + 0.75 h^+) \leq H^+ \leq (0.75 h_{1e}^+ + 0.75 h^+)$$

The effective height $h_{LE}^+$ of the larger height riblets above the new virtual wall position is at least 8 wall units greater, i.e. their height $h_L^+$ from the original wall surface is $$8 + (0.75 h_{1e}^+ + 0.75 h^+)$$

Figure 18:
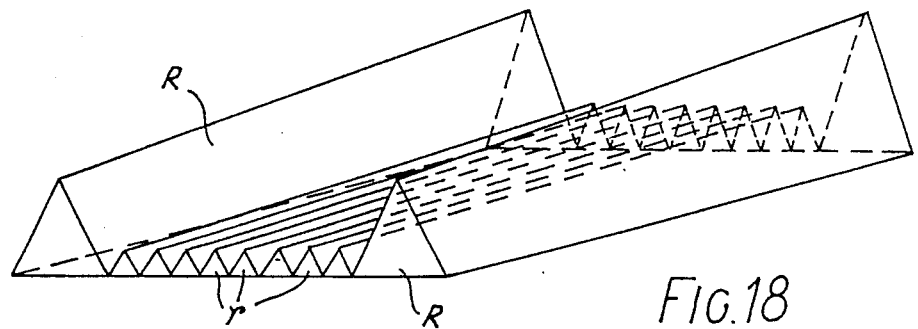

FIG. 18 illustrates the configuration of FIG. 1, as an example, with the riblets given progressively increasing heights with distance along the wall surface in the direction of fluid flow, as in the configuration of FIG. 13. This can be done with the configurations of projections described above, whether they are composed of pluralities of uniformly smaller height projections between successive larger projections or whether the smaller projections are themselves of different heights at any particular station in the direction of the stream.

Figure 19:
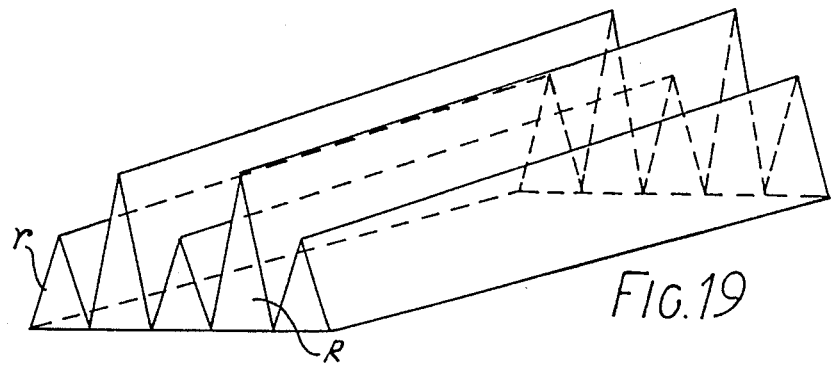
Figure 20:
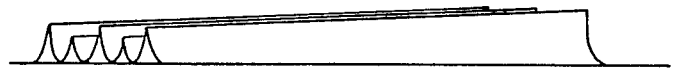
Figure 21:
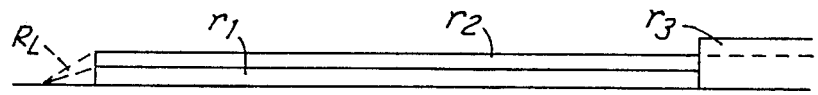

Also with regard to the streamwise increase of riblet height increase in its application to patterns of different height riblets the increase can be continuous, as shown in FIGS. 19 and 20, or stepped, as shown in FIG. 21. Since the self-limiting effect and progressive reduction of wall shear stress with development length that is countered by the height increase will first render the smallest riblets progressively inoperative, stepped height increases can be provided in a staggered manner; for example, FIG. 21 illustrates how, with a spanwise pattern of riblets $r_1$, $r_2$ of two different heights, the smaller riblets $r_1$ can be succeeded by a third series of riblets $r_3$ higher than the previously larger riblets $r_2$, and if a further stage is required the latter can be succeeded by a fourth still larger series, so that at each station in the direction of the stream the pattern is always composed of riblets of two different heights. FIG. 21 also indicates at $r_L$ how, at the leading edge of the riblet pattern the riblets can be faired into the wall surface to avoid a drag increase due to the flow meeting a bluff leading face. When there is a progressive stepped increase of the height of the riblets, as described above, the leading edge of each step may faired similarly, although this is not illustrated.

It will be understood that the other features already disclosed can be incorporated in any combination of the different configurations.

A further advantageous application of the increasing height riblets is in conjunction with large eddy break-up devices (LEBU's) where they can prolong the effective stream length in which the drag reduction effects of the LEBU's are experienced. The use of LEBU's with riblet surfaces as such is known from the US patent application of Walsh et al referred to above and further illustration is therefore not necessary for explaining the novel combination now proposed.

The riblet dimensions referred to above appear appropriate from the results of experiments carried out at relatively low free-stream velocities (U) and for Mach numbers (M) below about 0.3. However, it has been found that modification of the dimensions, in particular the riblet heights, is desirable for higher velocities and Mach Nos. It would appear that the streamwise length of the projections has a significant influence on the optimum dimensions especially at Mach Nos. greater than about 0.4M. Wind tunnel tests with uniform arrays of single-height V-groove riblets having a streamwise length of about 1 meter exemplify the change of dimensions in terms of wall units that is required to give optimum results at higher velocities. The following table, giving the riblet dimensions at the leading edge of the riblets, puts the data from these tests (3), (4), (5) at Mach Nos. in the range of 0.4–0.9M in context with previous low speed results (1), (2) in the range of 0.1M:

|     | Riblet height/span $h^+, s^+$ wall units | $R_{eL}$ |
| --- | --- | --- |
| (1) | 13 | $0.8 \times 10^6$ |
| (2) | 15 | $3 \times 10^6$ |
| (3) | 17 | $5 \times 10^6$ |
| (4) | 20 | $10 \times 10^6$ |
| (5) | 25 | $15 \times 10^6$ |

$R_{eL}$ being the length Reynolds No=$UL/\nu$, L being the length
of the riblets.

These results indicate that for optimum effect, at the leading edge of the riblets an increase of height in wall units of some 50% is required for a ten-fold increase of $R_{eL}$ relative to the low speed riblet height at $R_{eL} = 1 \times 10^6$.

The factors that determine the optimum are many and complex. The form of the underlying body, which may have streamwise and/or spanwise curvatures or discontinuities, and the possibility of non-uniform U values over the extent of a riblet array introduce further influences and an empirical evaluation of the optimum riblet dimensions may be necessary. For general purposes however, if the compensation for $R_{eL}$ is obtained by increasing the leading edge height of the riblets, and possibly also their spacing, it is suggested that in relation to the lower speed values given in the discussion of the illustrated examples above, an appropriate scaling factor of the leading edge height of the riblets in wall units in relation to $R_{eL}$ ($h^+$: $R_{eL}$) should be in the range 1:20 to 1:6.

Reference has already been made also to the possibility of scaling the increase of riblet dimensions along the length of the array irrespective of $R_{eL}$. The increase of projection height to mitigate the self-limiting effect of the projections should apparently be amplified therefore to compensate for length Reynolds No. effects. However, a combined scaling value for both effects would not normally be appropriate because the velocity related nature of the length Reynolds No. effects involves a further variable.

The optimum rate of increase of riblet height excluding length Reynolds No. effects will comprise at least a 5% rate per meter for the self-limiting effect and a 15% rate per meter for the effect of skin friction variation, giving a combined rate of 20% per meter. With compensation for length Reynolds No. effects by using a progressive increase of the riblet heights along their length, and allowing for the fact that skin friction is a function of velocity, the total optimum rate as a continuous increase of height might in practice be up to 50% per meter or even higher, up to about 100% per meter. These latter figures are attainable because of the ability of the progressively increasing height riblets to forcethe turbulent boundary layer flow further away from the basic wall surface.

The extent to which beneficial effects may be obtained will depend in practice on the wall surfaces to which the riblets are applied and the limits at which flow separation occurs over these surfaces. In particular instances it may be possible to continue the increase of height of the riblets up to a factor of 5 or more, but even in less favourable conditions an increase by a factor of at least 2 should be possible.

The invention is generally applicable to the wall surfaces of bodies in which a reduction of skin friction is sought. It may thus provide a means of reducing drag on the external surfaces of vehicles, including aircraft, land vehicles and watercraft. It can also be used in machines, e.g. for the blading, both rotating and stationary, of turbomachines, and for the internal surfaces of pipes and conduits. It will be understood that the invention includes the possibility of forming the surface projections integrally with the bodies concerned and also of providing surface elements, e.g. as sheets or tapes, having the projections, for application to bodies to provide the required surface configurations thereon.

I claim:

1. A fluid dynamic wall surface having a series of elongate projections on said surface extending in the direction of fluid flow relative to said surface for modification of a turbulent boundary layer on said surface, said projections comprising larger and smaller height projections, adjacent ones of said larger height projections being spaced apart from each other and a plurality of said smaller height projections being disposed therebetween, said larger height projections and said smaller height projections being discreet, separate formations of said surface, said larger height projections projecting farther into said boundary layer in use than all said smaller height projections.

2. A surface according to claim 1 wherein the projections form a substantially continuous spanwise array.

3. A surface according to claim 1 wherein the projections extend streamwise at least over the length of the turbulent boundary layer region of the wall surface.

4. A surface according to claim 1 wherein the smaller and/or the larger projections are sharp-peaked.

5. A surface according to claim 1 wherein the projections have a V-form profile.

6. A surface according to claim 1 wherein the projections have a profile which comprises concavely curved valleys between adjacent projections.

7. A surface according to claim 1 wherein the larger projections have an effective height of at least 8 wall units above the small projections, wherein a wall unit is a dimensionless value comprising an actual distance value multiplied by a scalar quantity expressing the variation of wall shear stress with fluid density and viscosity.

8. A surface according to claim 1 wherein smaller projections of at least two different heights are disposed between successive large projections.

9. A surface according to claim 1 wherein at least the larger height projections have side faces that are inclined at an angle that varies over the height of the projections, each said side face having an intermediate region and adjacent regions above and below said intermediate region, said intermediate region having a lesser steepness than said adjacent regions and forming the lower part of a concave profile peak of the associated projection.

10. A surface according to claim 9 wherein all the projections extending above a virtual wall height have side walls of said varying inclination, with said intermediate region positioned substantially at the virtual wall height, said virtual wall height being the distance by which turbulence in the boundary layer is displaced away from the wall surface by said projections.

11. A body having an aerodynamic or hydrodynamic wall surface provided with a series of projections according to claim 1.

12. The surface as claimed in claim 1 wherein said larger height projections have a peak-to-peak spacing between them of between 30 and 240 wall units wherein wall unit is a dimensionless value comprising an actual distance value multiplied by a scalar quantity expressing the variation of wall shear stress with fluid density and visosity.

13. A fluid dynamic wall surface having a series of elongate projections on said surface extending in the direction of fluid flow relative to said surface for modification of a turbulent boundary layer on said surface, said projections comprising larger and smaller height projections, adjacent ones of said larger height projections being spaced apart from each other and a plurality of said smaller height projections being disposed therebetween, said larger height projections and said smaller height projections being discreet, separate formations of said surface, said larger height projections projecting farther into said boundary layer in use than all said smaller height projections, and wherein said surface is provided with flat-bottomed valleys between at least some of said projections.

14. A fluid dynamic wall surface having a series of elongate projections on said surface extending in the direction of fluid flow relative to said surface for modification of a turbulent boundary layer on said surface, said projections comprising larger and smaller height projections, adjacent ones of said larger height projections being spaced apart from each other and a plurality of said smaller height projections being disposed therebetween, said larger height projections and said smaller height projections being discreet, separate formations of said surface, said larger height projections projecting farther into said boundary layer in use than all said smaller height projections, wherein said heights of said projections increase in the direction of the fluid flow.

15. A fluid dynamic wall surface having a series of elongate projections on said surface extending in the direction of fluid flow relative to said surface for modification of a turbulent boundary layer on said surface, said projections comprising larger and smaller height projections, adjacent ones of said larger height projections being spaced apart from each other and a plurality of said smaller height projections being disposed therebetween, said larger height projections and said smaller height projections being discreet, separate formations of said surface, said larger height projections projecting farther into said boundary layer in use than all said smaller height projections, wherein there is at least one gap between lengths of said projections, the gap width in the direction of fluid flow not being greater than the boundary layer thickness.

16. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units, with said projections of greater height projecting farther into said boundary layer in use than all said projections of lesser height, and wherein said pattern comprises individual projections of two different heights in continuous repeating sequences, each sequence consists of two projections one of smaller height and one of larger height wherein wall unit is a dimensionless value comprising an actual distance value multiplied by a scalar quantity expressing the variation of wall shear stress with fluid density and visosity.

17. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units, with said projections of greater height projecting farther into said boundary layer in use than all said projections of lesser height, and wherein said pattern comprises a symmetrical arrangement of projections of three different heights wherein wall unit is a dimensionless value comprising an actual distance value multiplied by a scalar quantity expressing the variation of wall shear stress with fluid density and visosity.

18. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units, with said projections of greater height projecting farther into said boundary layer in use than all said projections of lesser height, and wherein flat-bottomed valleys are provided between at least some of said projections wherein wall unit is a dimensionless value comprising an actual distance value multiplied by a scalar quantity expressing the variation of wall shear stress with fluid density and visosity.

19. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units, with said projections of greater height projecting farther into said boundary layer in use than all said projections of lesser height, and wherein said heights of said projections increase in the direction of the fluid flow wherein wall unit is a dimensionless value comprising an actual distance value multiplied by a scalar quantity expressing the variation of wall shear stress with fluid density and visosity.

20. A surface according to claim 19 wherein said increase of height is stepped, and wherein a larger height projection of the pattern preceding a step becomes a smaller height projection of the pattern following the step.

21. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units, with said projections of greater height projecting farther into said boundary layer in use than all said projections of lesser height, and wherein there are streamwise gaps between lengths of said projections, each gap width in the direction of the fluidflow being less than said boundary layer thickness wherein wall unit is a dimensionless value comprising an actual distance value multiplied by a scalar quantity expressing the variation of wall shear stress with fluid density and visosity.

22. A fluid dynamic wall surface, a series of elongate projections on said surface extending in the direction of fluid flow relative to said surface and effective to reduce drag of a turbulent boundary layer on said surface by inhibiting penetration of turbulence in the boundary layer into valleys between the projections, said projections having progressively increasing heights with distance along the wall surface in a direction of fluid flow, said height of the projections increasing at a rate of between 20% and 100% per meter length wherein said projections have progressively increasing pitches with distance along the wall surface in said direction of fluid flow.

23. A fluid dynamic wall surface, a series of elongate projections on said surface extending in the direction of fluid flow relative to said surface for modification of a turbulent boundary layer on said surface, said projections having increasing heights with distance along the wall surface in the direction of fluid flow, said heights of the projections increasing from their upstream towards their downstream ends by between 20% and 100% per meter length, wherein said projections have at least one stepped increase of height.

24. A fluid dynamic wall surface, a series of elongate projections on said surface extending in the direction of fluid flow relative to said surface for modification of a turbulent boundary layer on said surface, said projections having progressively increasing heights with distance along the wall surface in a direction of fluid flow, said height of the projections increasing at a rate of between 20% and 100% per meter length, wherein said projections have side faces that are inclined at an angle that varies over said height of said projections, each side face having an intermediate region and adjacent regions above and below said intermediate region, said intermediate region having a lesser steepness than said adjacent regions and forming the lower part of a concave profile peak of an associated projection.

25. A fluid dynamic wall surface, a series of elongate projections on said surface extending in the direction of fluid flow relative to said surface for modification of a turbulent boundary layer on said surface, said projections having progressively increasing heights with distance along the wall surface in a direction of fluid flow, said height of the projections increasing at a rate of between 20% and 100% per meter length, wherein there is a spanwise repeating pattern of projections which have at least two different heights at corresponding stations in said direction of fluid flow.

26. A fluid dynamic wall surface, a series of elongate projections on said surface extending in the direction of fluid flow relative to said surface for modification of a turbulent boundary layer on said surface, said projections having progressively increasing heights with distance along the wall surface in a direction of fluid flow, said height of the projections increasing at a rate of between 20% and 100% per meter length, wherein said projections extend downward of at least one large eddy break-up device.

27. A fluid dynamic wall surface having a series of elongate projections on said surface extending in the direction of fluid flow relative to said surface for modification of a turbulent boundary layer on said surface, said projections having at least two different heights and being disposed in a repeated span-wise pattern where adjacent projections differ in height by at least three wall units with said projections of greater height projecting farther into said boundary layer in use than all said projections of lesser height, wherein a wall unit is a dimensionless value comprising an actual distance value multiplied by a scalar quantity expressing the variation of wall shear stress with fluid density and viscosity.

28. A surface according to claim 27 wherein the projections form a substantially continuous spanwise array.

29. A surface according to claim 27 wherein the projections extend streamwise at least over the length of the turbulent boundary layer region of the wall surface.

30. A surface according to claim 27 wherein at least one projection of the pattern is sharp-peaked.

31. A surface according to claim 30 wherein the sharp-peaked projections have a V-form profile.

32. A surface according to claim 30 wherein the sharp-peaked projections have a profile which comprises concavely curved valleys between adjacent projections.

33. A surface according to claim 27 wherein the effective height of each larger height projection relative to a virtual wall position established by the smaller projections immediately adjacent to it is at least 3 wall units.

34. A surface according to claim 27 wherein at least the larger height projections have side faces that are inclined at an angle that varies over the height of the projections, each said side face having an intermediate region and adjacent regions above and below said intermediate region, said intermediate region having a lesser steepness than said adjacent regions and forming the lower part of a concave profile peak of the associated projection.

35. A surface according to claim 34 wherein all the projections extending above a virtual wall height have side walls of said varying inclination, with said intermediate region positioned substantially at the virtual wall height.

36. A body having an aerodynamic or hydrodynamic wall surface provided with a series of projections according to claim 27.

37. A fluid dynamic wall surface, a series of elongate projections on said surface extending in the direction of fluid flow relative to the surface and effective to reduce drag of a turbulent boundary layer on said surface by inhibiting penetration of turbulence in the boundary layer into valleys between the projections, said projections having progressively increasing heights with distance along the wall surface in the direction of fluid flow, said height of the projections increasing at a rate of between 20% and 100% per meter length.

38. A surface according to claim 37 wherein said increase of heights is continuous over at least a part of the length of the projections.

39. A surface according to claim 37 wherein the height of the projections increases at a rate of not substantially less than 50% per meter length.

40. A surface according to claim 37 wherein the projections form a substantially continuous spanwise array.

41. A surface according to claim 37 wherein the projections extend streamwise at least over the length of the turbulent boundary layer region of the wall surface.

42. A surface according to claim 37 wherein the projections are sharp-peaked.

43. A surface according to claim 42 wherein the sharp-peaked projections have a V-form profile.

44. A surface according to claim 42 wherein the sharp-peaked projections have a profile which comprises concavely curved valleys between the peaks.

45. A body having an aerodynamic or hydrodynamic wall surface provided with a series of projections according to claim 37.

46. A surface according to claim 42, wherein the sharp-peaked projections have a profile which comprises flat-bottomed valleys between the peaks.

47. A fluid dynamic wall surface having a series of elongate projections on said surface extending in the direction of fluid flow relative to the surface for modification of a turbulent boundary layer on said surface, said projections having at least two different heights with projections of lesser height being disposed between projections of greater height in a repeated pattern with the pitch of the projections of greater height being no greater than 50 wall units, wherein a wall unit is a dimensionless value comprising an actual distance value multiplied by a scalar quantity expressing the variation of wall shear stress with fluid density and viscosity.

48. A fluid dynamic surface having a series of elongate projections on said surface extending in a direction of fluid flow relative to said surface for modification of a turbulent boundary layer on said surface, said projections having at least two different heights with projections of lesser heights being disposed between projections of greater height in a repeated pattern with the pitch of said projections of greater height being no greater than 50 wall units, wherein said projections have three heights, those projections which have a height greater than those projections of least height being said projections of greater height wherein wall unit is a dimensionless value comprising an actual distance value multiplied by a scalar quantity expressing the variation of wall shear stress with fluid density and visosity.

49. The surface as claimed in claim 47 or claim 48 wherein the pitch of said projections of greater height is in the range of 6 to 50 wall units.

50. The surface as claimed in claim 49 wherein the pitch of said projections of greater height is in the range 30 to 40 wall units.

* * * * *